United States Patent [19]

Glabe et al.

[11] 3,950,551

[45] Apr. 13, 1976

[54] COMPOSITE SUGAR SYRUP ARTICLE AND PROCESS

[75] Inventors: Elmer F. Glabe, Northbrook; Perry W. Anderson, Niles; Stergios Laftsidis; Phillip G. Grothus, both of Chicago, all of Ill.

[73] Assignee: Food Technology, Inc., Chicago, Ill.

[22] Filed: Oct. 31, 1974

[21] Appl. No.: 519,607

[52] U.S. Cl. ............... 426/103; 426/656; 426/658; 426/516; 127/30; 426/661
[51] Int. Cl.² ...................... A23L 1/08; A23L 1/09
[58] Field of Search ........... 426/560, 656, 658, 103, 426/464, 661

[56] References Cited
UNITED STATES PATENTS

| | | | |
|---|---|---|---|
| 3,100,909 | 8/1963 | Schapiro | 426/656 |
| 3,185,574 | 5/1965 | Gabby et al. | 426/560 |
| 3,718,484 | 2/1973 | Glabe | 426/658 |

Primary Examiner—Jeanette M. Hunter
Attorney, Agent, or Firm—Johnston, Keil, Thompson & Shurtleff

[57] ABSTRACT

Dehydrated sugary syrups in the form of dried flakes or ground flakes obtained by thin film drying of liquid aqueous syrups of honey, high fructose corn syrup, invert sugar, corn syrup, malt syrup, sorghum syrup and/or molasses in the presence of ungelatinized starch which is partially gelatinized in situ and/or in the presence of a soy protein are moistened with water, or an aqueous solution of sucrose or of one of said syrups, and optionally a small amount of an edible vegetable oil, in sufficient amount to produce an extrudable mixture, said extrudable mixture is extruded through a tubular or annular die to produce a composite food article in the form of rods or tubes which are sliced into short pieces as they emerge from the extrusion die, and are thereafter dried on a tray or conveyor drier at temperatures within the range of 75°F. to 180°F. until the moisture content is reduced to approximately 1.0–4.0% by weight.

18 Claims, No Drawings

COMPOSITE SUGAR SYRUP ARTICLE AND PROCESS

BACKGROUND

Dehydrated sugary syrups in the form of dried flakes or ground flakes can be obtained by thin film drying of liquid aqueous syrups of honey, high fructose corn syrup, invert sugar, corn syrup, malt syrup, sorghum syrup and/or molasses in the presence of ungelatinized starch which is partially gelatinized in situ and/or in the presence of a soy protein. Thus, high fructose corn syrup or mixtures of high fructose corn syrup and honey can be dehydrated to form a product either in the form of flakes or in the form of ground powder which is dry appearing and free of gummy, sticky and lumpy characteristics as disclosed in U.S. Pat. No. 3,718,484.

For some purposes it is desirable to agglomerate such flakes or powder into larger sized particles but attempts to accomplish this have been generally unsuccessful. Also, problems have been encountered in attempting to obtain agglomerated products which are generally uniform in size and in resistance to attrition.

OBJECTS

One of the objects of the present invention is to provide a new and useful agglomeration process which is effective in agglomerating flakes or powder composed of products of the type previously described.

Another object is to produce agglomerated products from flakes or powder of the type previously described which are generally uniform in size and in resistance to attrition. Other objects will appear hereinafter.

BRIEF SUMMARY OF THE INVENTION

Dehydrated sugary syrups in the form of dried flakes or ground flakes obtained by thin film drying of liquid aqueous syrups of honey, high fructose corn syrup, invert sugar, corn syrup, malt syrup, sorghum syrup annd/or molasses in the presence of ungelatinized starch which is partially gelatinized in situ and/or in the presence of a soy protein are moistened with water, or an aqueous solution of sucrose or of one of said syrups, and optionally a small amount of an edible vegetable oil, in sufficient amount to produce an extrudable mixture, said extrudable mixture is extruded through a tubular or annular die to produce a composite food article in the form of rods or tubes which are sliced into short pieces as they emerge from the extrusion die, and are thereafter dried on a tray or conveyor drier at temperatures within the range of 75°F. to 180°F. until the moisture content is reduced to approximately 1.0–4.0% by weight.

DETAILED DESCRIPTION OF THE INVENTION

In the practice of the invention the starting material is a dehydrated sugary syrup in the form of dried flakes or ground flakes obtained by thin film drying of liquid aqueous syrups of honey, high fructose corn syrup, invert sugar, corn syrup, malt syrup, sorghum syrup and/or molasses in the presence of ungelatinized starch which is partially gelatinized in situ and/or in the presence of a soy protein. As previously indicated certain products of this type are described in U.S. Pat. No. 3,718,484 where high fructose corn syrup or mixtures of high fructose corn syrup and honey are dehydrated in the presence of an ungelatinized starch which becomes partially gelatinized during the process. In U.S. Pat. No. 3,833,413 similar products are described in which the products contain a certain type of water soluble soy protein.

In the present process these products in the form of flakes or in the form of ground flakes, (i.e., a powder) are placed in a macaroni-type or spaghetti-type extruder machine. Water is mixed into the flakes (or powder) while the machine is operating so that a mixture is formed by a turning mechanism which also advances the mixture toward an extrusion die. The mixing is on a continuous basis. Optionally, a vegetable oil is added. The quantity of water used and the amount of oil used will affect the texture of the finished agglomerates.

Approximately 3% by weight of vegetable oil yields the ideal texture crispness in the finished agglomerates. Smaller amounts or larger amounts of oil may also be used with good effect depending upon the finished texture desired. The moistened oil-coated flakes are then processed through the extrusion barrel of the macaroni press and then through a die. The latter can be a macaroni-type die extruding a tube-shaped piece, or it can be a spaghetti die extruding a rod-shaped piece.

Extruders of this type have cutter blades to sever the extruded product. The speed of the cutter blade on the extruder is set so that small pieces of the extruded flake-dough are cut off. The length of the pieces ideally is approximately ⅛ inch, although this dimension can be varied.

When a macaroni-type annular die is used the extruded products are tubular. When a spaghetti-type rod-shaped die is used, the extruded pieces have different configurations depending upon the diameter of the die aperture. Thus, a die aperture of 0.120–0.125 inch in diameter will give cut extruded pieces which are generally arcuate or curved in what can be described as a dish-shape.

This shape is apparently due at least in part to the drag exerted by the sides of the die aperture as well as by the action of the cutting blade in severing particles of approximately 1/16 to 3/16 in., preferably ⅛ thickness. These particles are generally uniform in diameter and thickness, are unique in appearance and have good resistance to attrition. A spaghetti-type rod-shaped die having a smaller die aperture of approximately 0.072 inch produces pieces that are bead shaped, spherical, or in the form of very small rods.

The agglomerates are then dried on a tray or conveyor drier so that they are in a more or less static condition, as distinguished from tumbling, at temperatures within the range of 75°F. to 180°F. It is usually preferable to circulate warm dry air through and over the agglomerates until the moisture content is reduced to approximately 1.0–4.0% by weight.

An important feature of this process is that in moistening the flakes or powder in the extruder, solutions of sucrose or any other soluble crystalline sugar may be used. Artificial flavoring may also be added as a part of the moistening water or sugar solution.

Solutions of liquid honey or liquid honey itself, or corn syrup, or combinations of both, or malt syrup, or combinations of malt syrup and corn syrup and honey may be used. When this is done, the finished agglomerates take on different texture characteristics and flavor characteristics. When honey is used as the flake-moistening material, the agglomerates are "chewy" in texture. When sucrose or other crystalline sugars are used, the agglomerates become crisper and less chewy. Obviously, sweetness is increased and, in the case of honey, the honey flavor of the finished agglomerates is markedly increased. It is to be noted that combinations of sugar syrups, honey, and crystalline sugars can be used to produce a variety of flavor and texture effects.

The invention will be further illustrated but is not limited by the following examples in which the quantities are given by weight unless otherwise indicated.

EXAMPLE I

The starting material was a product composed of high fructose corn syrup solids, honey solids, partially gelatinized wheat starch, and hydroxylated lecithin in the form of dried flakes obtained by the general procedure of Example I of U.S. Pat. No. 3,718,484 using the ingredients of Example V of said patent but without reducing the particle size in a hammermill. The flakes were placed in the dry materials mixer of a spaghetti extruder. Various amounts of water, or aqueous solutions of sugary syrups, with and without vegetable oil, were added to said flakes and mixed therewith for 10–15 minutes at room temperature (e.g., 70°–80°F.) and atmospheric pressure. The mixture was then fed to the barrel of the extruder where it was extruded by a screw feeder in approximately 1–5 minutes. The barrel of the extruder was water cooled to reduce the friction heat from the screw feeder as much as possible. The temperature of the mixture in this stage is usually within the range of 60°–125°F., preferably 70°–90°F. The diameter of the die orifice was 0.12 inch.

The extruded product was cut at approximately 1/16 to 3/16 inch intervals by a rapidly rotating knife just after emerging from the extruder die. The cut extruded agglomerates were then dried at temperatures within the range of 75°F. to 180°F. in a static condition on a tray drier to a moisture content of 1.0–4.0% by weight. The results were as follows:

a. with the addition of 15 parts of water per 85 parts of flakes and a drying temperature of 160°–180°F. for 4 hours, the product moisture was 1.5–2.0% by weight. The finished product was dry, very hard and tough in texture. There was some tendency to form lumps in the mixer but extrusion was good.

b. when the procedure was carried out as in (a) but with the addition of 13 parts of water per 87 parts of flake the extrusion was good and the agglomerates had good characteristics with a slightly tough texture.

c. the procedure was the same as in (a) except that 10 parts of water was added per 90 parts of flakes. Extrusion was fair. The agglomerates were fragile and there were many broken pieces or "fines".

d. the procedure was the same as in (a) except that 12 parts of water, 3 parts of oil and 85 parts of flakes were used and the product moisture was 1.0–2.0% by weight. The extrusion was good and the product character was excellent. The texture was crisp, not hard.

e. the procedure was the same as in (a) except that 10 parts of water and 5 parts cotton seed oil per 85 parts of flakes were added and the product moisture was 1.5–2.0% by weight. The product was more fragile, more crisp and less tough than that produced in (d).

f. the procedure was the same as in (a) except that 12 parts of water, 3 parts cottonseed oil, and 3 parts of a saturated solution of sucrose in water per 82 parts of flakes were used and the product moisture was 1.2 to 2.0% by weight. The product texture was very crisp and crunchy. The sweetness was greater than in the product from (d) and the general characteristics of the product were excellent.

g. the procedure was the same as in (a) except that 6 parts water, 3 parts cottonseed oil and 6 parts sugar syrup (saturated solution of sucrose in water at 70°–80°F.) per 85 parts of flakes were used and the product moisture was 1.0–2.5% by weight. The taste was sweeter than that of the product from (f) and the product was crisp and very desirable.

h. the procedure was carried out as in (g) except that liquid honey was substituted for the sugar syrup. The finished chips had a much stronger odor and taste of honey.

i. the procedure was carried out as in (a) except that 6.5 parts water and 6.5 parts sugar syrup per 87 parts of flakes were used. The product was chewy rather than crispy and crunchy.

j. the procedure was carried out as in (a) except that 11.8 parts water, 3 parts oil and 0.2 part artificial honey flavor per 85 parts flakes were used. The flavor of honey was accentuated but the product was not as sweet as in (f). This illustrates the possibilities of adding artificial flavors during the agglomeration process.

k. the procedure was carried out as in (a) except that 5.9 parts water, 5.9 parts honey, 3 parts cottonseed oil and 0.2 part artificial honey flavor per 85 parts flakes were used. The product was crisp, sweet and strongly honey flavored, although the note was obviously artificial.

l. the procedure was carried out as in (a) except that 6.0 parts water, 6 parts sugar syrup (sucrose), 3 parts dry granular sucrose and 3 parts cottonseed oil per 82 parts of flakes were used. The product was very sweet and very crisp and crunchy. The addition of the dry granular sucrose provides a coating of crystalline sugar on the outside of the finished chip thereby adding significantly to the crisp texture and the sweet taste.

m. the procedure was carried out as in (a) except that 17 parts water and 3 parts cottonseed oil per 80 parts of flakes were used. The product character was very hard and less crisp. The greater strength of this chip makes it more usable in certain applications in baking or in ice cream-making where the chip would come in contact with very wet doughs or with high-moisture-content solutions such as ice cream.

n. the procedure was carried out as in (a) except that 10 parts water and 5 parts cottonseed oil per 85 parts of flakes were used. The resultant chips were more crisp and more water miscible than those produced by (m).

EXAMPLE II

The procedure was the same as in Example I(a) except that 9 parts water, 9 parts liquid honey, 2.7 parts cottonseed oil and 2.7 parts soy flour (Soya Fluff 100) per 76.6 parts of flakes were used. The honey was mixed with the water and added to the flakes in the mixing step. The soy flour was added to the dough at the point where it passed from the mixer to the extruder. The product was less crisp than the product in Example I(f).

EXAMPLE III

The procedure was the same as in Example I(b) except that molasses flake and water in a weight ratio of 87:13 were used. The molasses flake was obtained as described in the Example of U.S. Pat. No. 3,843,821. The product moisture was 1.5–2.5% moisture by weight. Extrusion was good. The product texture was slightly tough.

EXAMPLE IV

The procedure was the same as in Example III except that 89 parts of molasses flake and 11 parts of water were used. The product moisture was 1.2–2.0% by weight. The product texture was very slightly tough but otherwise of excellent character.

EXAMPLE V

The procedure was the same as in Example III except that 90 parts of molasses flake and 10 parts water were used. The product moisture was 1.2–2.0% by weight. The texture was crisp and the product character was good. Some fines were present.

EXAMPLE VI

The procedure was the same as in Example III except that 10 parts water and 3 parts cottonseed oil were used per 87 parts molasses flakes. The extrusion was good. The product moisture was 1.2–2.0% by weight. The texture of the finished product was crisp and generally excellent.

Either a batch or a continuous press may be used. If the latter is employed, the feeding rates of the flakes, oil and water are adjusted so that agglomeration is well started by the time the ingredients have passed from the mixer to the point where they are ready to drop into the extrusion barrel. Timing will regulate the consistency of the mass.

This step produces a mass which is more like dough, since the cutting device on the extruder provides the important step of shaping the final agglomerates.

The dough may be extruded through a variety of dies. A macaroni die and a spaghetti die produce ideal finished chip shapes. The knife blade rotation speed and the rate of extrusion (speed of the auger) control the type, shape and dimensions of the chips. As the dough leaves the die and the blade cuts off the pieces, the latter expand in size approximately 50%. It is therefore important to keep this expansion in mind since it is a factor in the final size of the dried chips.

Reducing the amount of water added to the flakes in the press results in a chip which is less dense and more fragile. Careful regulation of the water content and oil content provides controls on the crispness or hardness of the final dried product. Varying the amount of oil also changes the character of the finished chip. Oil reduces the hardness of the chip. More than optimum quantities tend to make the finished chip more fragile and less dense.

General observations made on drying of products at the optimum flake, water and oil levels are as follows:

| | | |
|---|---|---|
| 160–180°F. | 3–4 hours | Crisp product |
| 160–180°F. | 2–3 hours | Chewy product |
| 160–180°F. | Less than 2 hours | Product not dry and commercially unusable |

The range of amounts of water added can vary from about 8% to about 27% by weight of the flake (or ground flake). However, the optimum water addition is 10% to 15% by weight of the flake. Any water added as a sugar solution or syrup should be taken into account.

The oil used in the practice of the invention can be any edible oil but is preferably a vegetable oil, e.g., cottonseed oil, peanut oil, coconut oil, safflower oil, sesame oil, corn oil and mixtures of any two or more of said oils. If an oil is used, it is ordinarily employed in an amount sufficient to reduce the hardness of the chip but insufficient to destroy its structure. Usually, the amount of oil used will be within the range of 1% to 6% by weight of extrusion mix, preferably 3% to 6% by weight, and about 1.5% to 7% by weight of the chips.

The foregoing conditions apply, regardless of whether the product to be agglomerated is a mixture containing fructose solids and honey solids or whether it is a flake derived entirely by dehydrating honey in the presence of starch and/or soy protein or by dehydrating molasses in the presence of starch and/or soy protein or by dehydrating other sugary syrups containing invert sugar, corn syrup, malt syrup, sorghum syrup, molasses, honey, high fructose corn syrup and mixtures thereof, dehydrated in the presence of starch and/or soy protein.

In the initial products which are agglomerated in accordance with the process of the invention, the relative proportions of sugar solids and starch solids are within the range of 40 to 70 parts of sugar solids to 60 to 30 parts of starch solids. While it is preferable to have starch solids derived from wheat starch, other types of starch including rice starch and corn starch, preferably grain starches, having a gelatinization temperature not lower than 150°F. can be employed. If a soy protein is included in the initial composition the amount of starch is correspondingly reduced. Thus, where mixtures of soy protein and starch are present the proportions are preferably within the range of 0.25 part to 29.75 parts by weight of soy protein and 29.75 parts to 0.25 part by weight of the starch per 70 parts by weight of the sugar syrup. If the starch is omitted altogether, the soy protein preferably corresponds to at least 30 parts per 70 parts by weight of the sugar syrup.

Where a soy protein is employed it should have a high protein content of at least 45% by weight and the water soluble protein content should be at least 20% by weight of the total protein content, preferably within the range of 20–90% by weight. A soy protein should be used which has been at least partially defatted and the weight ratio of water soluble protein to fat content should be at least 1.5:1 and preferably within the range of 1.5:1 to 90:1. Percentagewise in terms of weight percent the fat content of the soy protein is usually within the range of 1% to 16% but a soy protein having a high protein content and a low fat content in which the water soluble protein content is relatively low is undesirable.

If the initial product to be agglomerated is a mixture of sugar solids, for example, a mixture of high fructose corn syrup solids and honey solids or a mixture of high fructose corn syrup solids and sorghum solids, the weight ratio of the two components of the mixture is usually within the range of 15:85 to 85:15.

The term "high fructose corn syrup" as used herein refers to a corn syrup in which the solids content is a minimum of at least 40% by weight fructose (levulose), at least 40% by weight dextrose and the remainder high saccharides, chiefly maltose. The water content can vary but is usually around 29.0% by weight. The mineral content is small, usually about 0.05% by weight. A typical high fructose corn syrup contains 29.0% water and 71% solids. The solids consist essentially of 42% fructose, 50.0% dextrose and 8.0% higher saccharides, chiefly maltose.

Honey has the following composition (average of 490 samples of liquid honey Table I, page 11, "Composition of American Honey", United States Department of Agriculture Research Technical Bulletin 1M-2b):

|  | % by Weight | |
| --- | --- | --- |
|  | Normal Moisture Basis | Solids Calculated to a Dry Basis |
| Water | 17.200 | — |
| Fructose | 38.190 | 46.200 |
| Dextrose | 31.280 | 37.705 |
| Sucrose | 1.310 | 1.582 |
| Maltose | 7.310 | 8.828 |
| Higher Saccharides | 1.500 | 1.810 |
| Ash | 0.169 | 0.204 |
| Nitrogen | 0.041 | 0.050 |
| Undetermined | 3.000 | 3.621 |
|  | 100.000 | 100.000 |

Throughout the specification and claims the "water solubility" of the water soluble soy protein refers to water solubility as determined by a standard testing method given in Association of Official Agricultural Chemists (A.O.A.C.) 9th Edition, page 164, test 13.032, published in 1960.

The term "molasses" as used herein refers to the uncrystallizable syrup obtained on boiling down raw cane sugar or beet sugar which usually contains 70-75% solids and 30 to 25% water.

The invention is hereby claimed as follows:

1. A process for forming composite food articles of dehydrated sugary syrups obtained initially in the form of dried or ground flakes obtained by thin film drying of said syrups in the presence of a substance selected from the group consisting of (1) ungelatinized starch which is partially gelatinized in situ during the dehydration, (2) soy protein and (3) mixtures of said starch and said soy protein, said sugary syrups being selected from the group consisting of corn syrup, malt syrup, sorghum syrup, molasses, honey, high fructose corn syrup, sugary syrups containing invert sugar, and mixtures thereof, the said syrups being intimately mixed with one or more of said substances to form a slurry and subsequently said slurry being subjected in a thin film to a heated surface for a period of time sufficient to dehydrate said slurry to form a thin dehydrated film and the dried flakes or ground flakes being formed from said dehydrated film, which comprises mixing said dried or ground flakes with water in an amount sufficient to form an extrudable mixture, extruding said mixture through a tubular or annular orifice of a die, cutting the extruded mixture as it emerges from said die into pieces of predetermined thickness, said thereafter drying the resultant pieces in a static condition until the moisture content is reduced to approximately 1-4% by weight.

2. A process as claimed in claim 1 in which an edible oil is added to said mixture in proportions sufficient to reduce the hardness of the dried product without destroying its physical structure.

3. A process as claimed in claim 1 in which the water content of the extrudable mixture is 8% to 27% by weight of said flakes.

4. A process as claimed in claim 2 in which the amount of oil added to the extrudable mixture is 1-6% by weight of the total mixture.

5. A process as claimed in claim 1 in which the static drying temperature is 160°F. to 180°F. and the drying time is 2 to 4 hours.

6. A process as claimed in claim 1 in which a part of the water added to said flakes is replaced by an aqueous sweetener solution.

7. A process as claimed in claim 1 in which a part of the water added to said flakes is replaced by liquid honey.

8. A process as claimed in claim 1 in which said flakes comprise high fructose corn syrup solids.

9. A process as claimed in claim 1 in which said flakes comprise high fructose corn syrup solids and honey solids in a weight ratio of 15:85 to 85:15.

10. A process as claimed in claim 1 in which said flakes comprise molasses solids.

11. A process as claimed in claim 1 in which said flakes comprise honey solids.

12. A process as claimed in claim 1 in which said die has a tubular orifice of approximately 0.12 inch and said extruded pieces are severed from the extruded mixture in lengths from 1/16 inch to 3/16 inch.

13. A process as claimed in claim 1 in which a granular sweetener is added to said extrudable mixture.

14. A process as claimed in claim 1 in which soy flour is added to said extrudable mixture.

15. A product resulting from the process of claim 1.

16. A product resulting from the process of claim 2 containing 1.5% to 7% by weight of edible oil.

17. A product resulting from the process of claim 1 wherein said starch is a wheat starch, the sugar solids are from the group consisting of solids from honey, high fructose corn syrup, invert sugar, corn syrup, malt syrup, sorghum syrup, molasses, and mixtures of two or more of said substances, the relative proportions of sugar solids and starch solids are within the range of 40 to 70 parts by weight of sugar solids to 60 to 30 parts by weight of starch solids, said product being in the form of dish-shaped chips approximately 1/8 inch in diamter and 1/16 inch to 3/16 inch thick.

18. A product as claimed in claim 17 which comprises a soy protein in proportions of 0.25 part to 29.75 parts by weight soy protein and 29.75 parts to 0.25 part by weight of starch, said soy protein having a protein content of at least 45% by weight, a water soluble protein content of at least 20% by weight of the total protein content and a weight ratio of water soluble protein content to fat content in said soy protein of at least 1.5:1.

* * * * *

UNITED STATES PATENT AND TRADEMARK OFFICE
CERTIFICATE OF CORRECTION

PATENT NO. : 3,950,551
DATED : April 13, 1976
INVENTOR(S) : ELMER F. GLABE, PERRY W. ANDERSON, STERGIOS LAFTSIDIS and PHILLIP G. GROTHUS It is certified that error appears in the above-identified patent and that said Letters Patent are hereby corrected as shown below:

Column 7, line 60, before "thereafter", "said" should read --and--.

Signed and Sealed this

Twentieth Day of July 1976

[SEAL]

Attest:

RUTH C. MASON
*Attesting Officer*

C. MARSHALL DANN
*Commissioner of Patents and Trademarks*